(No Model.) 2 Sheets—Sheet 1.
W. S. LIVENGOOD.
ATTACHMENT FOR STREET CARS.
No. 428,501. Patented May 20, 1890.
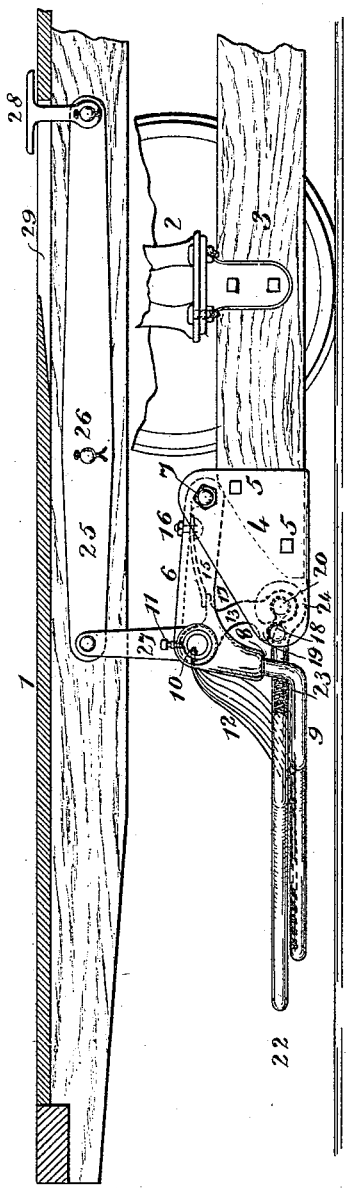
Fig. I.
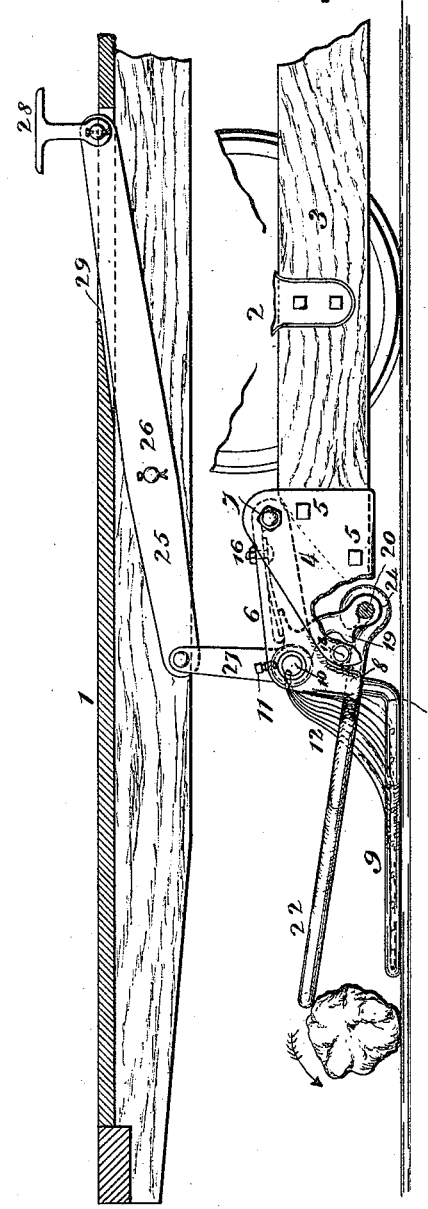
Fig. II.
Witnesses.
E. Arthur
Edward B. Knight
INVENTOR.
Winfield S. Livengood
by Knight Bros.
Attorneys (No Model.) 2 Sheets—Sheet 2.
W. S. LIVENGOOD.
ATTACHMENT FOR STREET CARS.
No. 428,501. Patented May 20, 1890.
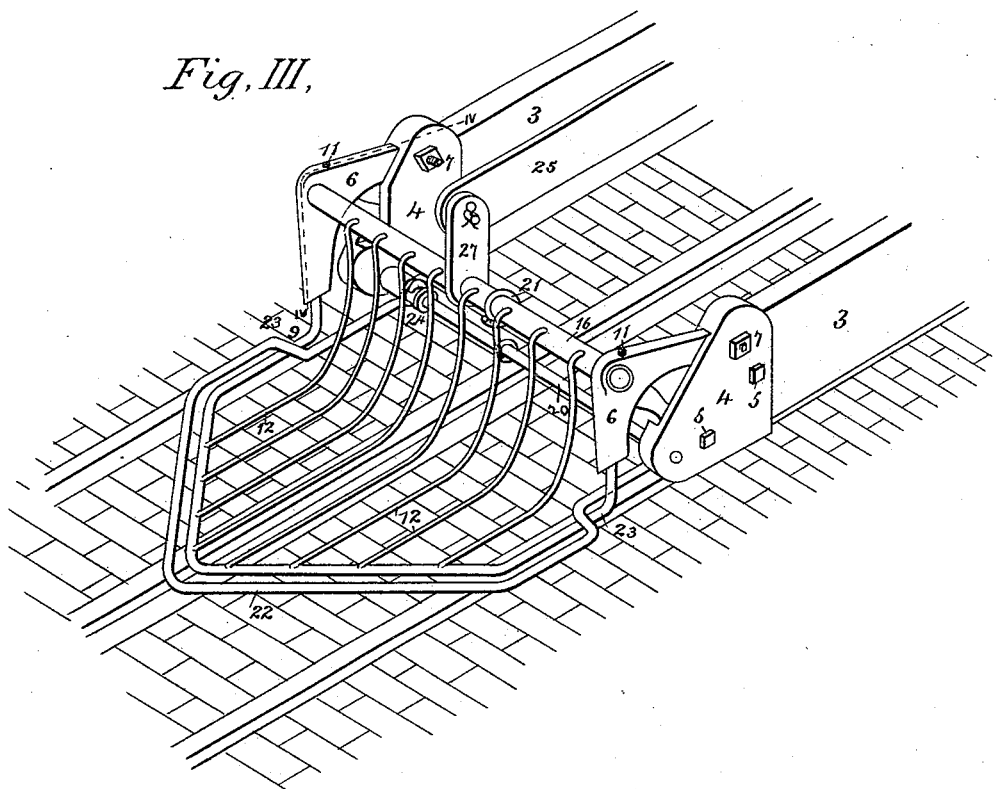

UNITED STATES PATENT OFFICE.

WINFIELD S. LIVENGOOD, OF KANSAS CITY, MISSOURI, ASSIGNOR OF ONE-HALF TO CHARLES L. BALLINTINE, OF SAME PLACE.

ATTACHMENT FOR STREET-CARS.

SPECIFICATION forming part of Letters Patent No. 428,501, dated May 20, 1890.

Application filed June 25, 1889. Serial No. 315,562. (No model.)

*To all whom it may concern:*

Be it known that I, WINFIELD S. LIVENGOOD, of Kansas City, in the county of Jackson and State of Missouri, have invented certain new and useful Improvements in Attachments for Street-Cars, &c., of which the following is a full, clear, and exact description, reference being had to the accompanying drawings, forming a part of this specification, and in which—

Figure I is a side elevation showing a portion of a car and the attachment in its closed or normal position. Fig. II is a similar view showing the attachment in the position it takes when picking up obstacles from the track. Fig. III is a perspective view of the attachment in its closed position. Fig. IV is an enlarged detail view taken on line IV IV of Fig. III.

This is an improvement on the device for the same purpose for which I made application for Letters Patent of the United States on or about the 2d day of April, 1889, under Serial No. 305,699.

Referring to the drawings, 1 represents a portion of the body of a car, 2 one of the trucks, and 3 a frame secured to the trucks to which my attachment is secured.

4 represents recessed shoes secured to the ends of the frame 3 by means of bolts 5.

6 represents arms, which are pivoted to the upper portions of the shoes 4 by means of bolts 7. The forward ends of these arms are provided with sockets 8, in which is secured the main frame of a fender 9, the frame extending in substantially a V shape in front of the trucks.

10 represents a transverse shaft journaled to the arms 6, the arms being provided with set-screws 11, by which means the shaft 10 is firmly secured to the arms.

12 represents a series of curved rods, which extend from the frame 9 to the shaft 10, one end of each of the rods being secured to the frame 9 and the other ends secured to the shaft 10.

13 represents links, the upper ends of which extend into recesses 14 in the arms 6 (see Fig. IV) and are pivoted to the shaft 10.

15 represents springs located in the recesses 14 of the arms, one end of each of the springs being secured to the arms by means of bolts 16, the free ends of the springs resting on lugs 17 on the links 13. Near the lower ends of the recessed shoes 4, I secure small friction-rollers 18.

19 represents lugs located on the links 13 near their lower ends, said lugs resting on the rollers 18 when the device is in its normal or closed position. (See Figs I and IV.) To the lower ends of the links 13, I secure a transverse rod 20, the rod having an additional support near its center in the form of hooks 21, which are supported by the shaft 10.

22 represents a substantially V-shaped guard, which extends for the most of the way in a parallel direction with the forward frame 9 of the fender, the guard encircling the fender-frame and being slightly in advance of the same. The rear of the guard is so shaped that it passes over the fender-frame at 23, and when the device is in its normal position the guard rests on the fender-frame. (See Figs. I and III.) The guard is secured at its rear end to the rod 20, as shown at 24.

25 represents a lever pivoted at 26 to the body of the car. The forward end of the lever has pivotal connection with the shaft 10 by means of a link 27. The rear end of the lever is provided with a treadle 28, there being an opening 29 in the floor of the car, which permits the lever to rise or fall, as may be desired.

The operation is as follows: When the device is in its normal position, as shown in Figs. I, III, and IV, the lugs 19 of the links 13 will rest on the rollers 18, thus holding the fender and guard a slight distance above the track, as shown in Fig. I. When the guard 22 strikes an obstacle, as shown in Fig. II, the guard will be forced backward, and as it has connection with the lower end of the links 13 it will force the links backward until the lugs 19 pass off of the friction-rollers 18, which permits the fender to fall onto the track, as shown in Fig. II, in which position it will pick up any obstacle, however small it may be. When it is desired to raise the fender again to its normal position, the operator presses down the treadle 28, and the lever raises the fender from the track. When the fender has been raised to such a height that the bottom of the lugs 19 come on line with the top of the friction-rollers 18, the pressure of the springs 15 on the lugs 17 will force the links forward until the lugs rest firmly on the friction-rollers, holding the fender, as shown in Fig. I.

It will be observed that the guard 22 always falls with the fender. The forward end of the guard would also fall with the fender, provided the object struck remained stationary, and provided its center of gravity was above the line of the guard; but the center of gravity of most obstructions on railways is below the plane of the guard, and as the object rests on the ground the guard will give it a rolling motion in the direction shown by the arrow, thus raising the guard over the obstacle and preventing injury, which might be caused were the guard to have a direct thrust against the obstacle.

I do not confine myself to the means shown for raising the fender, as other means may be used, if desired.

I claim as my invention—

1. In an attachment for street-cars, a fender and guard secured to pivoted arms, in combination with pivoted links by which the guard is connected to the arms and lugs on the links engaging a fixed bearing, substantially as described, and for the purpose set forth.

2. In an attachment for street-cars, a fender and guard secured to pivoted arms, in combination with pivoted links by which the guard is connected to the arms, lugs on the links engaging a fixed bearing, and springs for holding the lugs on the bearing, substantially as described, and for the purpose set forth.

3. In an attachment for street-cars, the combination of the arms 6, pivoted to a suitable support, fender secured to the arms, links 13, having a pivotal support, guard 22, connected with the links, lugs 19 on the links, and friction-rollers 18, forming a bearing for the lugs 19, substantially as described, and for the purpose set forth.

4. In an attachment for street-cars, the combination of the supporting-shoes, friction-rollers journaled to the shoes, arms pivoted to the shoes, shaft connecting the arms, fender secured to the arms, links pivoted to the shaft and having bearing on the friction-rollers, rod connecting the links, and guard connected to the rod, substantially as described, and for the purpose set forth.

5. In an attachment for street-cars, the combination of a frame secured to the trucks, shoes secured to the frame and carrying a fixed bearing, arms pivoted to the shoes, fender secured to the arms, links having a suitable pivotal support, and lugs on said links, the lower lug serving to hold the fender in its normal position by resting on the fixed bearing and the upper lugs forming a bearing for the springs 15, substantially as described, and for the purpose set forth.

6. In an attachment for street-cars, the combination of a pivotal fender and guard and means in connection with the car whereby the fender and guard may be raised to their normal position, substantially as described, and for the purpose set forth.

7. In an attachment for street-cars, the combination of the shoes 4, having a suitable support and carrying a fixed bearing, arms 6, pivoted to the shoes, fender secured to the arms, shaft 10, secured to the arms by a set-screw 11, links 13, having suitable bearings for supporting the arms, guard 22, secured to the links, lever 25, secured to the car, link 27, connecting the lever with the fender, and treadle 28 on the lever, substantially as described, and for the purpose set forth.

WINFIELD S. LIVENGOOD.

In presence of—
 JAS. E. KNIGHT,
 E. T. CROSBY.